July 16, 1968    R. A. HEISLER    3,392,811

GEAR RELEASED CLUTCH WITH POSITIVE BRAKE

Filed Jan. 16, 1967

INVENTOR.
RAYMOND A. HEISLER

BY

*Ralph R. Roberts*
AGENT

United States Patent Office 3,392,811
Patented July 16, 1968

3,392,811
GEAR RELEASED CLUTCH WITH
POSITIVE BRAKE
Raymond A. Heisler, 657 Dakota Trail,
Franklin Lakes, N.J. 07417
Filed Jan. 16, 1967, Ser. No. 609,385
7 Claims. (Cl. 192—12)

ABSTRACT OF THE DISCLOSURE

An indexed apparatus utilizing a worm and worm gear in which the worm is freely rotatable upon a driven shaft and is biased into frictional drive engagement with a clutch shoulder on the driven shaft. The pitch of the worm and rotation of the driven shaft is used so that when a releasable stop is caused to engage a dog or pin on the worm gear or apparatus connected thereto the frictional engagement driving the worm is overcome. In the sudden stop the worm is caused to move slightly away from the driving face and remains so until such time as the releasable stop preventing the worm gear from rotating is released whereupon the worm is biased into frictional engagement with the clutch face and is rotated in its usual manner to drive the worm gear.

Background of the invention

*Field of the invention.*—The field of art to which this indexed apparatus pertains as a general class is entitled Clutches and Power Stop Control and particularly the art in the subclass of Clutch and Brake. The art also is found in those classifications pertaining to the subclass of Clutches with further subclassed definitions under Clutches such as One-way engaging and with Slidable Pawls, also Clutches having a Stop Mechanism in which may be provided a Limit stop or Rotary-member control.

*Description of the prior art.*—Indexing mechanisms or stop-and-go mechanisms are well known in the art. However, in the use of intermittent feeds in which the feed is responsive to indiscriminate or irregular procedures it is necessary that the stop-and-go mechanism be responsive to those conditions in which items cause a reponse during their advancement. The signaling device providing the response may be in the nature of micro-switches, electric eyes, and the like. Regular advancement as by Geneva mechanisms coupled with electro or electro-magnetic clutches or mechanically operated clutches are expensive, oftentimes erratic in operation, and in many cases simply do not perform in a manner to produce the desired result.

An intermittent driving mechanism is shown in the U.S. Patent No. 2,915,160 issued to Schneider on Dec. 1, 1959 which mechanism uses opposed teeth adapted to engage in one direction and to be forced out of engagement in an opposite direction. A worm is used in the hoist clutch brake shown in U.S. Patent No. 3,138,231 issued to Lock on June 23, 1964. However, this worm is adapted to cause the clutch faces to be more firmly brought into driving engagement as the load is increased. In a clutch and brake shown in U.S. Patent No. 3,194,367 issued to Winter on July 13, 1965 is shown a worm adapted to cause the clutch faces to be more firmly brought into engagement upon the application of more power. A worm is also used for transferring the clutch face from one position to another. However, in none of the apparatus above-described is there a worm and worm gear in which a stop force when applied to the worm gear causes a biased worm to move against the bias to disengage from a friction driving means.

It is therefore an object of this invention to provide a simple indexed mechanism or inexpensive stop-and-go mechanism which in addition to providing a mechanism of high reliability is responsive to a signal means. This mechanism also provides a safety limit device in which the apparatus when over-loaded or jammed effects an immediate disengagement of the driving means from the rotational force.

Summary of the invention

The indexed feeding mechanism of this invention utilizes a worm and worm gear, the worm being freely rotatable upon a driven shaft. This shaft has a fixed collar thereon with a face providing clutch or driving face so that as the shaft is rotated the clutch face is rotated. Urging the worm axially along the shaft and that end of the worm which is adapted to engage the clutch face into engagement with this clutch face is a compression spring rotatable with the shaft, which spring provides a determined bias. A stop means such as a dog or pin is provided on the worm gear or apparatus driven thereby. This stop means is preferentially engaged by means of a pawl such as a solenoid operated plunger and the like, which pawl or plunger is adapted to move into and out of the way of the stop means or pin on the worm gear and upon engagement therewith causes the worm gear to abruptly stop. The rotation of the worm against the teeth of the worm gear causes the worm to move a short distance forwardly on the driven shaft thereby compressing the spring slightly and causing a disengagement of the clutch driving face of the collar on the shaft and the engaging face of the worm. Upon disengagement of the pawl from the stop means or pin of the worm gear the worm gear is released whereupon the worm is urged axially rearwardly by means of the spring into engagement with the clutch face causing the worm to rotate and drive the worm gear.

It is therefore an object of this invention to provide an indexed or stop-and-go rotating mechanism of inexpensive cost, simplicity of operation, ease of maintenance and of high versatility. The indexed drive of this invention further provides a safety or over-load device which in the case of over-loading of the drive as in the manner of a stop immediately causes the mechanism to stop with the worm disengaging from the clutch and stopping further rotation of the equipment.

It is a further object of this invention to provide an indexed feeding mechanism in which a driver and follower gear are disposed in driving engagement with the driver gear freely rotatable and axially movable on a driven shaft, the driver gear by bias means being urged into frictional driving engagement with a driven shaft carried clutch face, and a stop means on the follower gear or connected mechanism and a pawl or the like movable into and out of engagement with the stop means so that when the pawl is moved into engagement with the stop means the follower gear is stopped and the driver gear is moved out of driving engagement with the clutch face and when the pawl is moved out of engagement of the stop means the driven gear is urged into engagement with the clutch face.

There has been outlined rather broadly the most important features of the indexed apparatus of this invention in order that the detailed description which follows may be better understood and in order that the present contribution to the art may be more fully appreciated. Those persons skilled in the art will appreciate that the conception on which the present disclosure is based may be utilized as a basis for designing other structures carrying out the several purposes of this invention.

There has been chosen a specific embodiment of the invention for the purposes of illustration and description and this embodiment is shown in the accompanying drawing which forms a part of this specification wherein:

Description of the preferred embodiment

Figure 1:
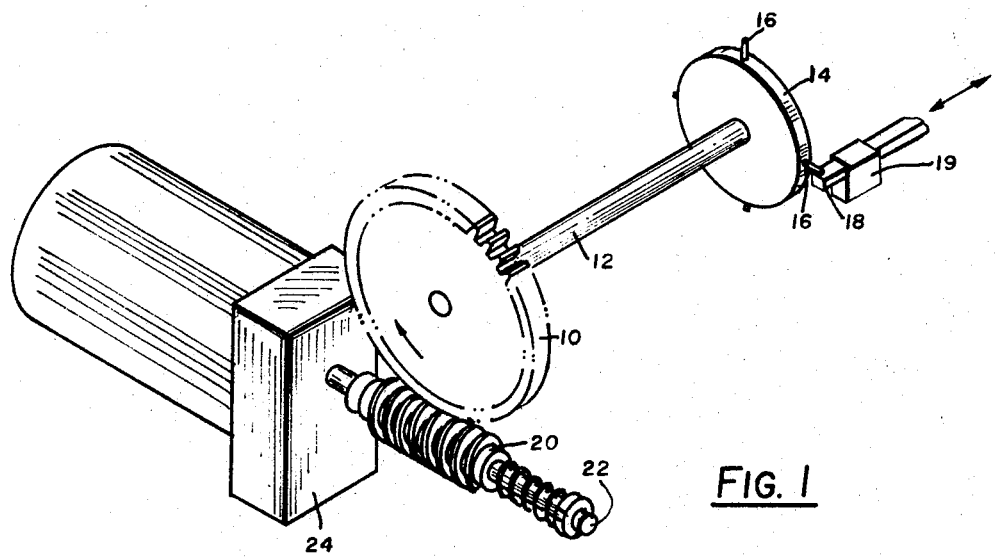
FIG. 1 represents an isometric view of the assembly of the components providing an indexed apparatus of this invention.

Referring now in particular to the drawing in which like numbers refer to like members throughout the several figures and in particular to FIG. 1 in which there is illustrated a worm gear 10 connected by a shaft 12 to a member 14 representing connected apparatus. A stop means in the form of a plurality of stop pins 16 is mounted in member 14. Adapted to move in and out of the way of these stop pins is a latch 18 carried in a bearing support 19 and reciprocated by a solenoid or the like not shown. Meshed with the worm gear 10 and driving said gear is worm 20 carried on shaft 22 which is rotated as by a motor 24.

Figure 2:
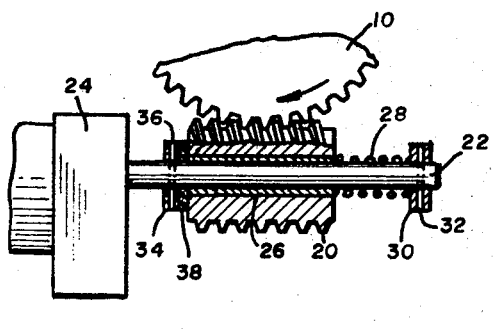
FIG. 2 represents a sectional view in slightly enlarged scale showing in particular the worm and worm gear components with the worm in driven position in relation to the clutch face.

Referring next to FIG. 2 it is to be noted that worm 20 is freely rotatable and axially movable on shaft 22 by means of a bearing 26. This worm 20 is urged leftwardly on shaft 22 by means of a spring 28 predeterminedly compressed between the worm and a collar 30 and having one end disposed against the worm 20 and the other end against the inner face of the collar 30 which is pinned to the shaft 22 by dowel 32. To the leftward side of the worm 20 there is fixedly mounted on the shaft a collar 34 pinned to said shaft by means of a dowel 36. Carried by and rotated with collar 34 is clutch face or disc 38 which is preferably attached to the collar. This face may be a friction material or toothed to mate with a like toothed contour on the face of worm 20.

Use and operation

The indexed feeding mechanism arranged for use likely has motor 24 as a gear motor or the motor or other power means may be otherwise coupled to shaft 22 to give the desired rotational speed to this shaft. Shaft 22 may also be journaled in bearing and be fixedly coupled to a motor source in conventional arrangement as by roller chain or V-belt depending upon the apparatus construction. Worm gear 10 carried on shaft 12 is sized so as to turn shaft 12 at the selected speed, when driven by worm 20, the shaft 12, of course, transmitting the rotational power required to operate the mechanism. Referring particularly to FIG. 2 it is to be noted that as the shaft 22 is rotated the compressed spring 28 urges the worm 20 leftwardly against the clutch face 38 so that the worm is driven and rotated whereupon it drives the engaged worm gear 10. The frictional driving force, of course, is sufficient to rotate the worm at substantially the full speed of shaft 22. The frictional engagement of worm and clutch is greater than the work necessary for transporting or moving the apparatus in which work is to be done. The configuration of the spring 28, of course, is determined by the amount of driving force necessary to rotate shaft 12 to produce the desired work and a certain amount of experimentation may be necessary to insure that the spring tension is sufficient to maintain the worm in engagement with the driving clutch face 38.

Figure 3:
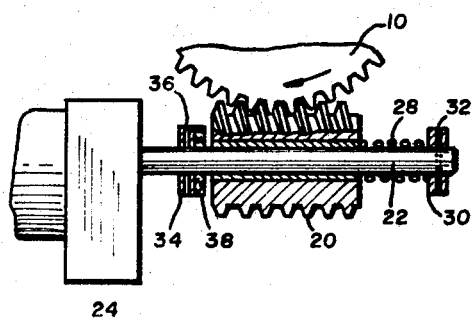
FIG. 3 represents the sectional view of FIG. 2 but showing the worm in an idle or disposed position in relation to the clutch face.

Latch 18, as seen in FIG. 1, is in the way of and in engagement with one of the stop pins 16 preventing rotation of the worm gear 10 at which point the drive is as in FIG. 3. When the latch 18 is moved rightwardly and from engagement with pin 16 the driven member 14 is released whereupon spring 28 pushes worm 20 backwardly or leftwardly into driving engagement with the clutch face 38. The frictionally driven worm starts to rotate with the shaft 22 and drives the worm gear 10 until such time as latch 18 is brought once again in the way of one of the pins 16. As member 14 is rotated the pin 16 is moved until it is engaged by the latch 18 whence the rotation of shaft 12 ceases. However, the rotation of worm 20 continues for a moment and during this time the worm will climb or advance itself rightwardly on the stopped worm gear 10 until it disengages itself from the clutch face 38 and moves to the position seen in FIG. 3. In this condition the shaft 22 continues to rotate but worm 20 being freely rotatable upon the shaft 22 remains in non-rotating operation until the latch 18 is moved from in the way of the stop pin 16 whence spring 28 once again urges the worm leftwardly to bring its driving or leftward face into engagement with the mating clutch face 38.

It is to be noted that in FIG. 3 the distance shown between the end of the worm 20 and the clutch face 38 is about one-sixteenth of an inch. As reduced to practice, this distance may be from a few thousandths of an inch to as much as or more than one-eighth of an inch. The force of the spring 28, the rotational speed of the worm, and the sliding or mating surfaces of worm and gear all effect the distance the worm moves from the driving face of clutch face 38. It is only necessary that the distance be such that the frictional drive force be absent during the stop period when the latch 18 is in the way of pin 16.

As reduced to practice and particularly in feeding devices in which items are irregularly placed upon a conveyor these items are usually sensed either by a microswitch or by an electric eye. In response to a signal from these means the latch 18 is moved in the way of the pin 16 or from in engagement with the pin. This pin incidentally may be mounted upon the worm gear 10 instead of driven member 14 it only being necessary that the stop member be positively effective on the rotation of the worm gear 10. It is often desirable to have only a single stop pin 16 mounted in the worm 10 so that the shaft 12 produces a determined amount or type of work in one rotation of shaft 12, as for example, a punch press type of operation. Associated or cooperative apparatus may provide a transport mechanism while the drive produced by motor 24 provides a reciprocation of a punching, stamping or printing operation upon a prescribed area of an item irregularly fed on the transport mechanism. In such an operation, one pin 16 provides a positioning point so that the latch 18, when moved from the pin by a solenoid activated by an electrical circuit actuated by a microswitch or other sensing means, releases the worm gear for a determined cycle of operation.

It is to be noted that the bearing 26 although shown as a bronze bearing may be any conventional bearing arrangement. The bearing means in the worm requires that the worm be movable axially at least a few thousandths of an inch on the shaft while freely rotatable thereon. The frictional engagement between the end of the worm 20 and the clutch face 38 must be sufficient in size and coefficient of friction to provide a transmission means sufficient to transmit the desired rotational power from the driven collar 34 to the worm 20.

Although the indexed apparatus or stop-and-go mechanism above-described is simple of construction and of operation it nevertheless provides a novel and highly reliable means of performing a determined operation in response to a signal. In addition to providing a one-way rotation and stop mechanism the frictional drive provides an over-load safety feature in that any jamming of the mechanism immediately stops the worm gear and as described above the spring 28 compress slightly as the worm 20 disengages from the clutch face 38. This type of drive is distinctly different from the single rotational pawl-type drive found on punch presses and the like. It is also to be noted that in certain instances where the drive force to the shaft 12 must be varied that instead of a fixed collar 30 there is mounted upon a threaded portion of shaft 22 a threaded collar which provides means for adjusting the tension on the spring 28. In this manner the field condition of the drive is adjusted to increase or decrease the spring tension in the particular application of the drive force necessary to rotate the connected apparatus.

It is to be noted that on certain drives, particularly where the transmitted force is relatively high, it is often desirable to provide toothed surfaces on the clutch and mating surface of the worm. These toothed surfaces are conventionally formed with abutment teeth in the manner of one-way clutches and with shallow teeth so that the worm need advance only a short distance before disengaging from the clutch. Also, the biasing means represented by the spring may instead be a fluid retaining cylinder such as a hydraulic or pneumatic cylinder in which the pressure is adjusted to provide the desired thrust of the worm 20 against the clutch face 38.

The drive above-described may be used strictly as an overload drive in which case the latch 18 need not be used and in which a switch may be adapted for actuation by the axially moved and disengaged worm. This switch may act as a cutout to shut off the motor or to change the motor to half speed or the like. The response combinations or arrangements are many and obvious and the only novelty herein claimed is that, as an overload responsive drive, the worm in an overload condition is axially moved on the shaft to a disengaged position from the clutch means.

Terms such as "left," "right," "up," "down" and the like are applicable to the embodiment shown and described in conjunction with the drawing. These terms are merely for the purposes of description and do not necessarily apply to the position in which the indexed apparatus may be constructed or used.

The conception of the indexed apparatus and its many applications is not limited to the specific embodiment shown but departures therefrom may be made within the scope of the accompanying claims and without sacrificing its chief advantages and protection is sought to the broadest extent the prior art allows.

What is claimed is:

1. In an indexed apparatus having a shaft rotated by a motive force and in which the force is transmitted from the shaft to a driver member by means of a clutch wherein the improvement comprises: (a) a worm freely rotatable and axially movable on the rotated shaft adapted to drive a connected apparatus, the worm having a clutch engaging face; (b) a frictioned surfaced member carried on and rotated by the shaft and adapted for engaging and rotating the worm; (c) a spring urging the worm into driving engagement with the friction surfaced member; (d) a worm gear in engagement with and rotated by the worm; (e) a stop means connected to said worm gear; (f) a latch movable into the way of said stop means to stop the worm gear from rotation and movable away from the stop means to release the stopped worm gear so as to resume its rotation; and (g) means for causing the worm to be axially moved on its shaft and away from a driving clutch engagement when the worm gear is stopped and to be moved on its shaft and into driving clutch engagement when the worm gear is released to rotate.

2. In an indexed apparatus as in claim 1 in which the stop means is a pin and the like carried by the worm gear.

3. In an indexed apparatus as in claim 1 in which the stop means is a pin and the like carried by apparatus moved in response to the rotation of the worm gear shaft.

4. In an indexed apparatus as in claim 1 in which the latch is movable in response to a signal fed to a solenoid and the like, said solenoid adapted to move the latch into and out of engagement with the stop means.

5. In an indexed apparatus as in claim 1 in which the worm is carried by a bearing which is rotatable on and is axially movable on the rotated shaft and in which the spring is a compression spring carried by the rotated shaft and having one end engaging the worm and having the other end engaged by and adjustably tensioned by a collar adjustably movable on the rotated shaft.

6. In an indexed apparatus as in claim 5 in which the clutch means is a collar attached to and rotated by the rotated shaft and in which the friction surface is carried by the collar.

7. In an indexed apparatus as in claim 1 in which the worm is carried on a bearing both rotatable and axially movable on the rotated shaft, the worm having one end disposed to engage a collar attached to the rotated shaft and having a friction surface carried by the face adjacent the worm; the spring having one end adapted to urge the worm toward the friction surface and with the other end of the spring engaged and retained by a collar mounted on the rotated shaft; so that when the latch engages a stop pin on the worm gear, said gear is stopped in its rotation and the worm continues to rotate and advances axially on the rotated shaft and against the bias of the spring whereupon as the thread of the worm engages the stopped worm gear teeth the worm is axially moved on the rotated shaft until the driving face of the worm moves from driving engagement of the friction surfaced member.

References Cited

UNITED STATES PATENTS

| | | | |
|---|---|---|---|
| 1,235,940 | 8/1917 | Shipman | 192—24 |
| 1,806,326 | 5/1931 | Belshaw | 192—25 X |
| 2,693,322 | 11/1954 | Mercier | 192—20 X |
| 2,708,993 | 5/1955 | Munschauer | 192—56 X |
| 2,711,237 | 6/1955 | Wylie | 192—24 X |
| 2,915,160 | 12/1959 | Schneider | 192—24 X |

BENJAMIN W. WYCHE, III, *Primary Examiner.*